March 23, 1971   R. M. ORTLIEB   3,572,197
ADJUSTABLE TOOLHOLDER
Filed Dec. 10, 1968
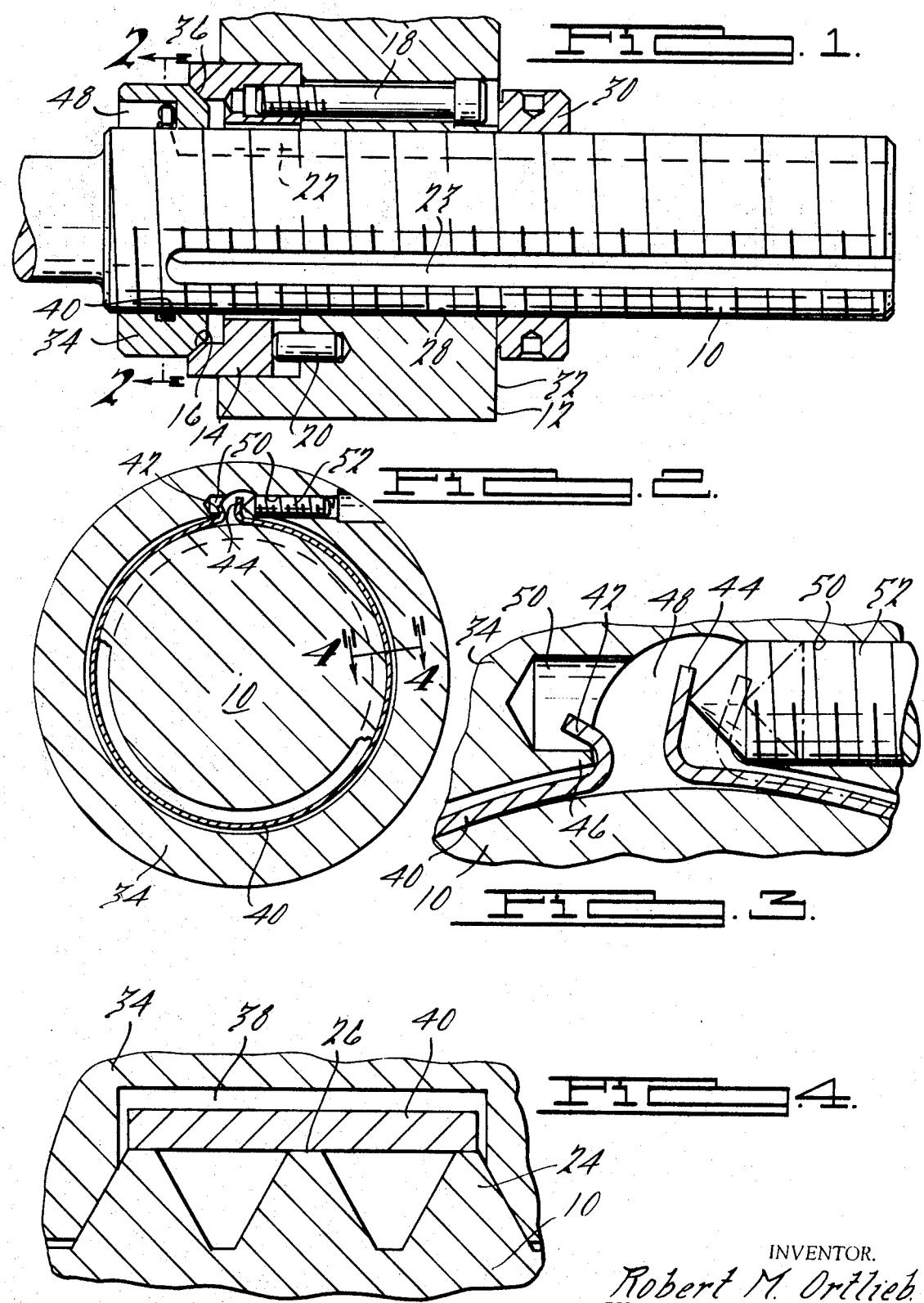
INVENTOR.
Robert M. Ortlieb
BY
Harness, Dickey & Pierce
ATTORNEYS.

United States Patent Office 3,572,197
Patented Mar. 23, 1971

3,572,197
ADJUSTABLE TOOLHOLDER
Robert M. Ortlieb, Southfield, Mich., assignor to Devlieg Machine Company, Royal Oak, Mich.
Filed Dec. 10, 1968, Ser. No. 782,654
Int. Cl. B23b 29/04
U.S. Cl. 82—36
6 Claims

ABSTRACT OF THE DISCLOSURE

An adjustable tool supporting structure in which a threaded tool carrying shank is located along its thread axis on a supporting member by means of an adjusting collar. The collar as well as a locking nut are threaded onto the shank. The collar engages a seat on one side of the supporting member while the locking nut bears against the opposite side thereof. A special band is used to hold the collar in a desired position on the shank when the shank is not clamped on the supporting member.

SUMMARY OF THE INVENTION

A variety of adjustable toolholders or cutting tools have been utilized which incorporate an adjusting collar for locating a threaded tool shank or the like, along its thread axis. It is frequently desirable to provide some means of locking such a collar in a given position on the threaded shank. For example, such locking collars are frequently positioned on the shank in a presetting fixture or the like, and are then transported to the machine tool where they are secured to a drive spindle or other supporting member of the machine tool. Of the various known devices which might be used for locking an adjusting collar in position, practically all tend to distort the collar or displace the collar from a centered position on the threads of the shank. An adjusting collar not only locates the shank axially but it frequently performs a centering function and any locking device which impairs the centering capability of the collar is highly undesirable.

It is therefore an object of the present invention to provide an adjustable tool supporting structure having means for securing an adjusting collar in a desired position on a threaded tool shank when the shank is not clamped in the supporting structure in which it is used. Among the other objects of the present invention are the provision of a lock for an adjusting collar of the above character which does not impair the centering function of the collar, does not distort the collar or create inaccuracies in the location of the tool shank, which is relatively inexpensive to manufacture, which will permit adjustment of the locking collar with a wrench or the like while preventing manual or inadvertent loosing and which is reliable in operation.

The foregoing objects of the present invention are achieved in a construction wherein the adjusting collar threaded on a tool carrying shank is provided with a recess which recieves a band adapted to clamp onto the threads of the shank and having a non-rotatable fit with respect to the adjusting collar.

DESCRIPTION OF THE VIEWS OF THE DRAWINGS

FIG. 1 is a longitudinal section view of a toolholder made in accordance with the present invention;
FIG. 2 is a sectional view of the structure illustrated in FIG. 1 taken along the line 2—2 thereof;
FIG. 3 is an enlarged view of a portion of the structure illustrated in FIG. 2, and
FIG. 4 is an enlarged sectional view of the structure illustrated in FIG. 2, taken along the line 4—4 thereof.

DETAILED DESCRIPTION OF THE PREFERRED EMBODIMENT

A representative embodiment of the invention is illustrated in FIGS. 1 to 4, wherein a tool holder in the form of a threaded shank 10 is supported on a supporting member or body 12. The body 12 is provided with an annaular seat 14 on one side thereof. The seat 14 comprises a separate annular member having a conical seating surface 16 and is fastened to the body 12 by means of cap screws 18. Dowel pins 20 are fitted between the seat 14 and body 12 to prevent rotation of the seat 14 with respect to the body 12. The seat 14 has a plurality of radially inwardly projecting keys 22 fitted in longitudinally extending keyways 23 of the shank 10 to prevent rotation of the shank 10 with respect to the body 12 and seat 14.

The threaded shank 12 is formed with an acme thread 24 extending over the major portion of its length. The thread 24 has a crest 26 which is of ground cylindrical configuration and is slidably but snugly fitted within a cylindrical bore 28 of the body 12. A locking or clamping nut 30 is threaded onto the thread 24 and engages a flat rear surface 32 of the body 12. The locking nut 30 cooperates with an adjusting collar 34 which is also threaded on to the thread 24 of the shank 10. The collar 34 has a conical seating surface 36 which seats against the conical seating surface 16 of the seat 14 and the surfaces 16 and 36 are held in engagement by the locking nut 30 which applies a rearward or right hand force to the shank 10, as viewed in FIG. 1. The left hand end of the threaded shank 10 carries a metal cutting tool (not shown).

It will be appreciated that when the locking nut 30 is loosened and the adjusting collar 34 is rotated the shank 10 will move longitudinally within the bore 28 as it is prevented from rotating by engagement of its keyways 23 with the keys 22. Accordingly, rotation of the adjusting collar 34 is effective to adjust the axial position of the shank 10. It is frequently desired to position the collar 34 in a precise location on the shank 10 in a presetting fixture (not shown). The shank 10, with its collar 34, is then transported from said fixture to the body 10 which is mounted on the machine tool (not shown) with which the metal cutting operation is to be performed. During such transportation of the shank 10 it is important that the collar 34 remain precisely in its adjusted position. The present invention is particularly concerned with a mechanism which will retain the collar 34 in a selected position on the thread 24.

Looking now at FIGS. 2, 3 and 4, it will be seen that the adjusting collar 34 is formed with an annular groove or recess 38 open to the inner periphery of the collar 34. A split clamping band 40 is carried within the groove 38 and is provided with spaced shoulder portions or ends 42 and 44. The end 42 is reversely bent with respect to the main portion of the band 40 and engages a finger or abutment 46 formed in the collar 34 as the result of the machining of an axial slot 48 and a tapped hole 50 within the collar 34. As viewed in FIG. 3, the abutment 46 prevents counterclockwise movement of the end 42 of the band 40 while the end 44 of the band is engaged by a set screw 52 threaded into the hole 50. The set screw 52 is adjustable generally tangentially of the band 40 for the purpose of moving the end 44 toward the end 42. Upon such adjustment, the band 40 is radially contracted to grip the crest 26 of the thread 24.

Looking at FIG. 4, it will be seen that the width of the band 40 is sufficient to span three convolutions of the thread 24 and provide extensive area contact between the band and the thread 24. By this means a substantial frictional grip of the band on thread 24 is achieved which nonrotationally locks the collar 34 on the thread 24 due to the engagement of abutment 46 and set screw 52 with the ends 42 and 44, respectively, of the band 40.

It is significant to note than upon the tightening of the band 40 by the set screw 52, no forces are applied to the collar 34 which would tend to displace the collar 34 in any radial direction. Accordingly, the collar 34 will remain generally centered with respect to the thread 24 and hold the shank 10 in proper alignment. It is also significant to note that the set screw 52 may be tightened only sufficiently to prevent inadvertent or accidental rotation of the collar 34 but not so tightly as to prevent the collar from being rotated manually or with a wrench to produce a desired adjustment of the collar 34 on the thread 24.

I claim:

1. An adjustable tool structure including a supporting member and having a seat, a shank supported on said supporting member and having a male thread provided with a cylindrical crest, an adjusting collar having a female thread threaded on said shank, locking means cooperable with said shank and said supporting member to hold said collar against said seat, said collar having an inwardly open annular recess adjacent its inner periphery, a radially contractable band in said recess, and means on said collar operable to contact said band into gripping engagement with more than 180° of said male thread crest and hold said collar against rotation with respect to said band.

2. The structure set forth in claim 1 wherein said band is split and has a pair of circumferentially spaced ends, said last named means being operable to move said ends toward one another.

3. The structure set forth in claim 2, including a fixed abutment on said collar engageable with one of said ends and an adjustable member carried by said collar and adjustable generally tangentially of said band to move the other one of said ends toward said one end.

4. The structure set forth in claim 1 in which said supporting member has a cylindrical bore in which said shank thread is slidably but snugly fitted.

5. The structure set forth in claim 1 wherein said band is provided with a pair of circumferentially spaced end portions, a fixed abutment on said band engageable with one of said end portions and a threaded element adjustable tangentially of said band and engageable with the other of said end portion in order to move said other end portion toward said one end portion.

6. The structure set forth in claim 1 in which said band is of an axial length greater than one convolution of said shank thread.

References Cited

UNITED STATES PATENTS

| | | | |
|---|---|---|---|
| 1,104,731 | 7/1914 | Heimar | 151—25 |
| 2,652,270 | 9/1953 | Jones | 287—110 |
| 3,404,590 | 10/1968 | Sweeny | 82—36 |

LEONIDAS VLACHOS, Primary Examiner

U.S. Cl. X.R.

29—96; 77—58; 151—25; 287—110, 118